United States Patent
Katoch

[11] Patent Number: 6,135,705
[45] Date of Patent: Oct. 24, 2000

[54] PRODUCT STACKING METHOD AND APPARATUS

[75] Inventor: Brian Katoch, Reedley, Calif.

[73] Assignee: Salwasser Manufacturing Company, Inc., Reedley, Calif.

[21] Appl. No.: 09/276,924

[22] Filed: Mar. 26, 1999

[51] Int. Cl.[7] .................................................. B65G 57/30
[52] U.S. Cl. ..................... 414/795; 414/795.3; 198/461.3
[58] Field of Search ................................. 414/795, 795.3; 198/461.3

[56] References Cited

U.S. PATENT DOCUMENTS

| | | | |
|---|---|---|---|
| 1,292,635 | 1/1919 | Parker | 414/795 |
| 2,570,198 | 10/1951 | Brager | 414/795 |
| 3,685,671 | 8/1972 | Layman | 214/6 BA |
| 3,895,477 | 7/1975 | Yamashita | 53/59 R |
| 4,030,528 | 6/1977 | Horning | 141/10 |
| 4,815,581 | 3/1989 | Deutschlander | 198/461 |
| 4,955,783 | 9/1990 | Grazia | 414/795 |
| 4,958,983 | 9/1990 | Fisch | 414/795.3 |
| 5,088,883 | 2/1992 | Focke et al. | 414/795 |
| 5,142,844 | 9/1992 | Frye | 53/475 |
| 5,261,782 | 11/1993 | Smith | 414/795.3 |
| 5,419,425 | 5/1995 | Goater | 198/461.3 |
| 5,626,335 | 5/1997 | Radwanski et al. | 271/159 |
| 5,641,072 | 6/1997 | Otake | 209/524 |
| 5,727,925 | 3/1998 | Ozawa et al. | 414/795.3 |
| 5,762,175 | 6/1998 | Focke et al. | 198/461.2 |
| 5,832,693 | 11/1998 | Yuyama et al. | 53/169 |
| 5,882,176 | 3/1999 | Marcoux | 414/795.3 |

*Primary Examiner*—Douglas Hess
*Assistant Examiner*—Joseph A. Fischetti
*Attorney, Agent, or Firm*—Mark D. Miller

[57] ABSTRACT

Disclosed is a new machine for continuously stacking packages in a vertical orientation for insertion into cases. A lift area is provided having a plurality of lateral lifting panels on either side. The panels are adjustably attached to pairs of continuous rotating bands, such that for each panel on one side there is a corresponding panel on the other side. The panels are provided in two independently operated sets, each set having identical operation, but with alternating action. Two horizontal conveyors deliver packages to the lifting area, the conveyor closer to the lift operating at a faster speed than the more distant conveyor. The faster speed creates a time and space gap between packages delivered to the lifting area, which gap may be increased or decreased by varying the conveyor speed. As the conveyors deliver packages to the lifting area, the two sets of lifting panels are alternatively activated to raise the packages in a stack, providing a continuous stacking operation.

13 Claims, 4 Drawing Sheets

PRODUCT STACKING METHOD AND APPARATUS

BACKGROUND OF THE INVENTION

1. Field of the Invention

The present invention relates to case loading machines, and in particular to a new method and apparatus for continuously stacking articles, cartons or packages for insertion into a case or box.

2. Description of the Prior Art

In the packaging industry, numerous different machines have been developed to accomplish the ever present tasks of erecting, filling, and closing containers ("cases" or "boxes") for goods. All of these tasks may be performed by a single machine, or they may be accomplished using a series of different machines, each machine dedicated to a different task. The machine of the present invention is designed to perform the task of continuously stacking cartons in a vertical orientation prior to insertion into open cases.

There are numerous automated stacking machines known in the prior art. Traditional carton stacking machines employ a lift at the end of a conveyor which brings incoming cartons. After a predetermined number of cartons are conveyed onto the lift, the conveyor stops as the lift first raises the stack of cartons up for delivery onto an upper catch plate, and then lowers back down into position to receive the next group of cartons. Machines which employ this method of operation are slow because of the inherent delay in the flow of cartons through the machine. This is because the lifting mechanism must raise and lower, stopping the incoming conveyor for considerable amounts of time.

Another continuous stacking apparatus is disclosed in U.S. Pat. No. 5,261,782. The complicated machine disclosed therein provides a pair of stacking plate assemblies which reciprocate in a stair-step fashion along the longitudinal incoming path of the product cartons. However, this inefficient and large machine requires countless moving parts and considerable space to perform the stacking operation.

It is therefore desirable to provide a compact, simple machine and method for continuously stacking cartons in a vertical orientation for insertion into cases.

SUMMARY OF THE INVENTION

The present invention provides a method and apparatus for continuously stacking articles, cartons or packages in a vertical orientation for insertion into cases. The machine of the present invention employs a plurality of parallel lateral lifting cleats or panels mounted on four pairs of synchronized continuous chains, belts or bands. The continuous bands are located on opposite sides of a lifting area, with two pairs of bands on each side. A conveyor delivers packages at one end of the lifting area such that the bands are on either side of the packages. Each band travels on a continuous path or circuit such that it is moving in an upward direction as it travels through the inside of the lifting area (upstream), and in a downward direction as it returns on the outside of the lifting area (downstream).

A first pair of bands on each side of the lifting area are pivotally attached to a plurality of elongated cleats or lifting panels such that the panels protrude into the lifting area as they are moved upstream by the bands. The distance between the bands of each pair may be adjusted in accordance with the space needed to receive the selected size and number of packages. This same adjustment is made to the bands on both sides of the lifting area. Then, at least two elongated panels of equal length are attached to each first pair of bands. The panels are attached on both sides of the lifting area in parallel such that for each panel that is attached to the first pair of bands on the right side, a corresponding panel is attached to the first pair of bands on the left side.

The movement of the first pairs of bands on each side of the lifting area is synchronized and simultaneous. Thus, as the pair on one side of the lifting area moves, the corresponding pair on the opposite side mirrors the same movement. In this way, the panels mounted thereon form the sides of an upwardly moving floor for lifting the packages.

A second pair of chains, belts or bands are also provided on each side of the lifting area which support a second plurality of cleats or panels. The second pairs of bands and panels operate in precisely the same fashion as the first set; however, the timing of their operation is staggered from that of the first pairs.

In a typical operational sequence, the prescribed number of product packages are conveyed in a row into the lift area. Two packages are illustrated in the drawings, although any number may be conveyed in. The first pair of bands are activated moving lifting panels into position below the row of packages on each side. The panels quickly lift the row of packages up. As soon as the packages have been raised high enough to allow clearance for another row of packages, the first bands pause briefly as a new row of packages is conveyed in below the first row.

Meanwhile, as soon as the first bands began to raise the first packages, the second pair of bands was activated to move the second lifting panels into position below the new row of packages on each side. As soon as the new row of packages is conveyed into the lift area, these panels quickly lift these packages up. Almost immediately the top surface of the new row of packages reaches the first set of lifting panels (holding the first row of packages). At this point, the first pair of bands are again activated, causing the first set of lifting panels to be withdrawn to the sides. This causes the first row of packages to now rest on top of the new row of packages.

The first bands then continue moving until they bring another set of panels into position in the lifting area below the next row of packages as it is being conveyed in, and the process repeats: The second bands pause briefly as the next row of packages is conveyed in. As soon as the next row has been conveyed in, the first bands and panels quickly lift up this next row of packages. Just as the top surface of the next row reaches the second set of lifting panels (holding a row of packages), the second pair of bands are again activated, causing the second set of lifting panels to be withdrawn to the sides, such that the new row of packages now rests on top of the next row of packages. The second bands then continue moving until they bring another set of panels into position in the lifting area below yet another row of packages as it is being conveyed in, and so on.

Successive rows of packages are alternatively lifted by the panels on the first and second bands as described above in a continuous and rapid fashion.

The conveyor which delivers packages for stacking includes two sets of side belt conveyors and a bottom conveyor. The packages are brought in and conveyed horizontally against one another (back to back) in a steady stream by the first set of side belt conveyors. The second set of side belt conveyors moves the packages exiting from the first conveyors and quickly delivers these packages to the lifting area. The second set of side belt conveyors has a much faster speed than the first set, thereby creating a gap between each package. This gap provides the lifting bands ample time to raise each row of packages out of the way, allowing the packages to be delivered in a continuous manner. A bottom belt conveyor completes the delivery of the packages into the lifting area. The speed of the second set of side belt conveyors may be adjusted to provide gaps of different sizes (and time lengths) between packages. In some situations, it may be desirable to employ a very high speed creating a sizeable time and space gap between packages in order to allow the lifting panels enough time to rotate into position to receive subsequent packages.

In the preferred embodiment, each of the four pairs of bands is operated by a separate servo motor. Alternatively, linkages may be established such that a first servo motor controls the first pair of bands on both sides of the lifting area, and a second servo motor controls the second pair of bands on both sides of the lifting area.

It is therefore a primary object of the present invention to provide a machine for continuously and rapidly stacking packages of products for insertion into larger cases.

It is also an important object of the present invention to provide a method and apparatus for quickly and continuously lifting packages into vertical stacks by using sets of corresponding side panels mounted to continuous bands.

It is also an important object of the present invention to provide a package stacking method and apparatus in which there is little or no delay between the stacking of successive rows of packages.

Other objects of the invention will be apparent from the detailed descriptions and the claims herein.

DETAILED DESCRIPTION OF THE PREFERRED EMBODIMENT

Figure 1:
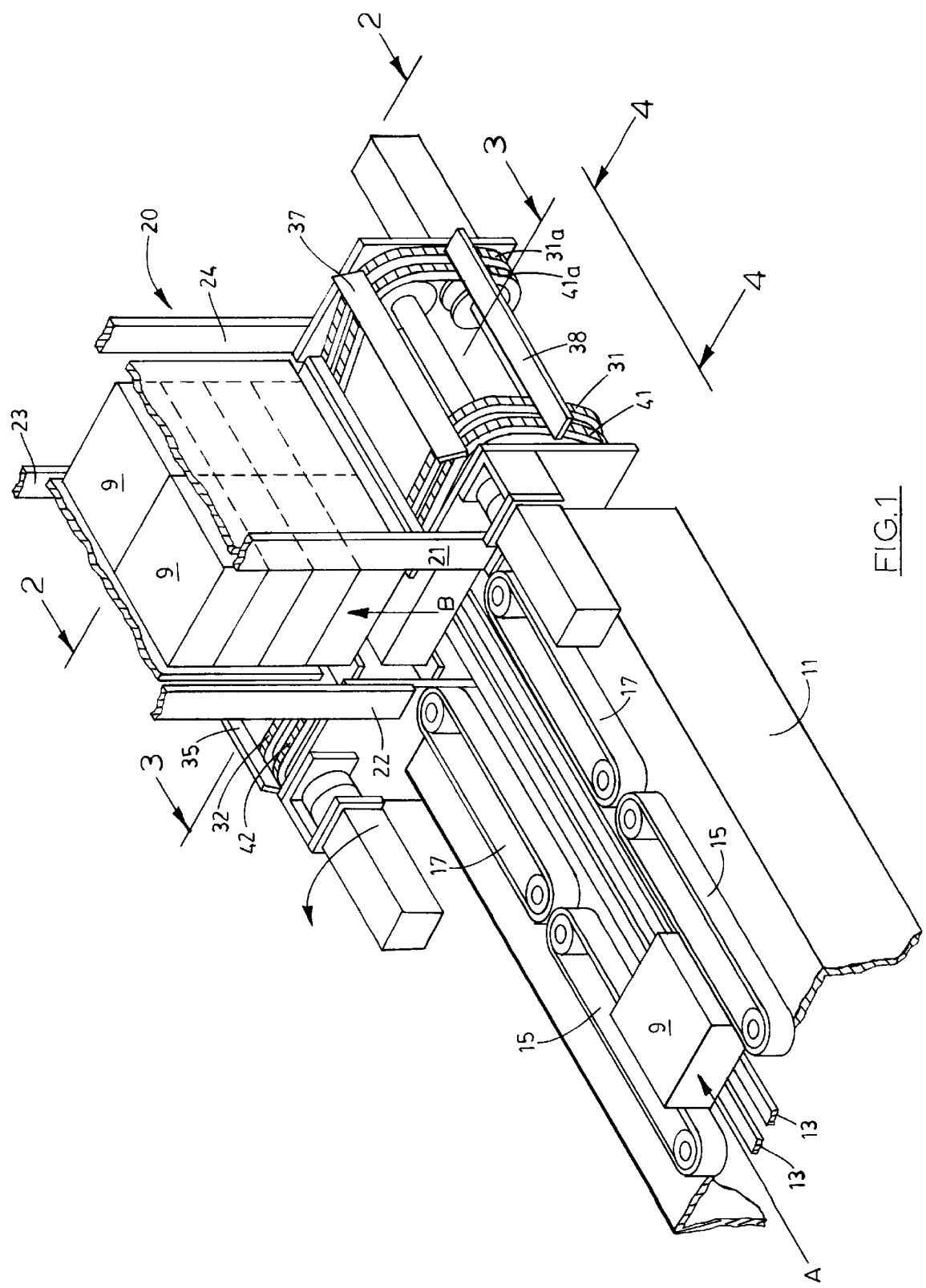
FIG. 1 is a perspective view of the present invention.
Figure 2:
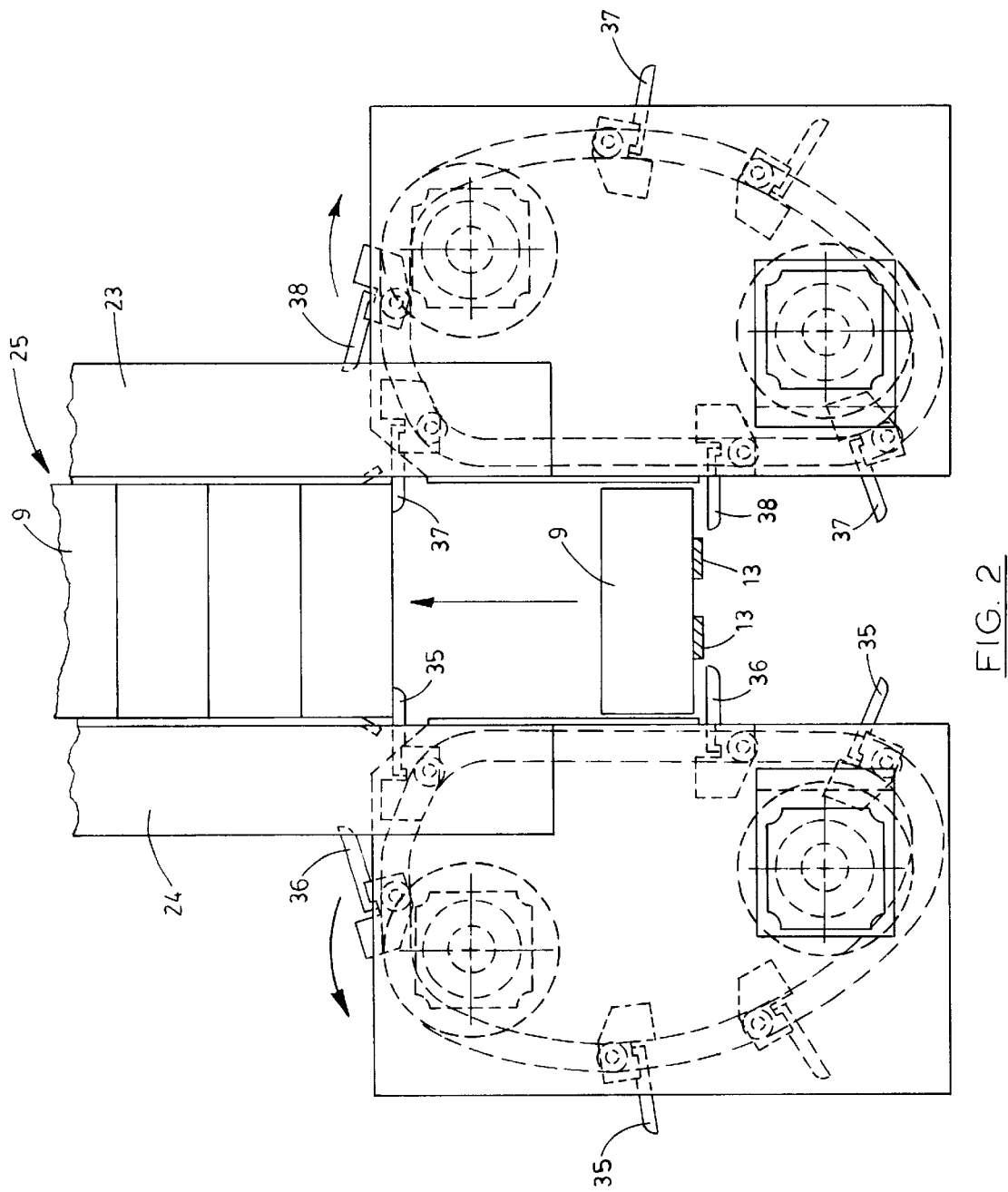
FIG. 2 is an end view along line 2—2 of FIG. 1.
Figure 3:
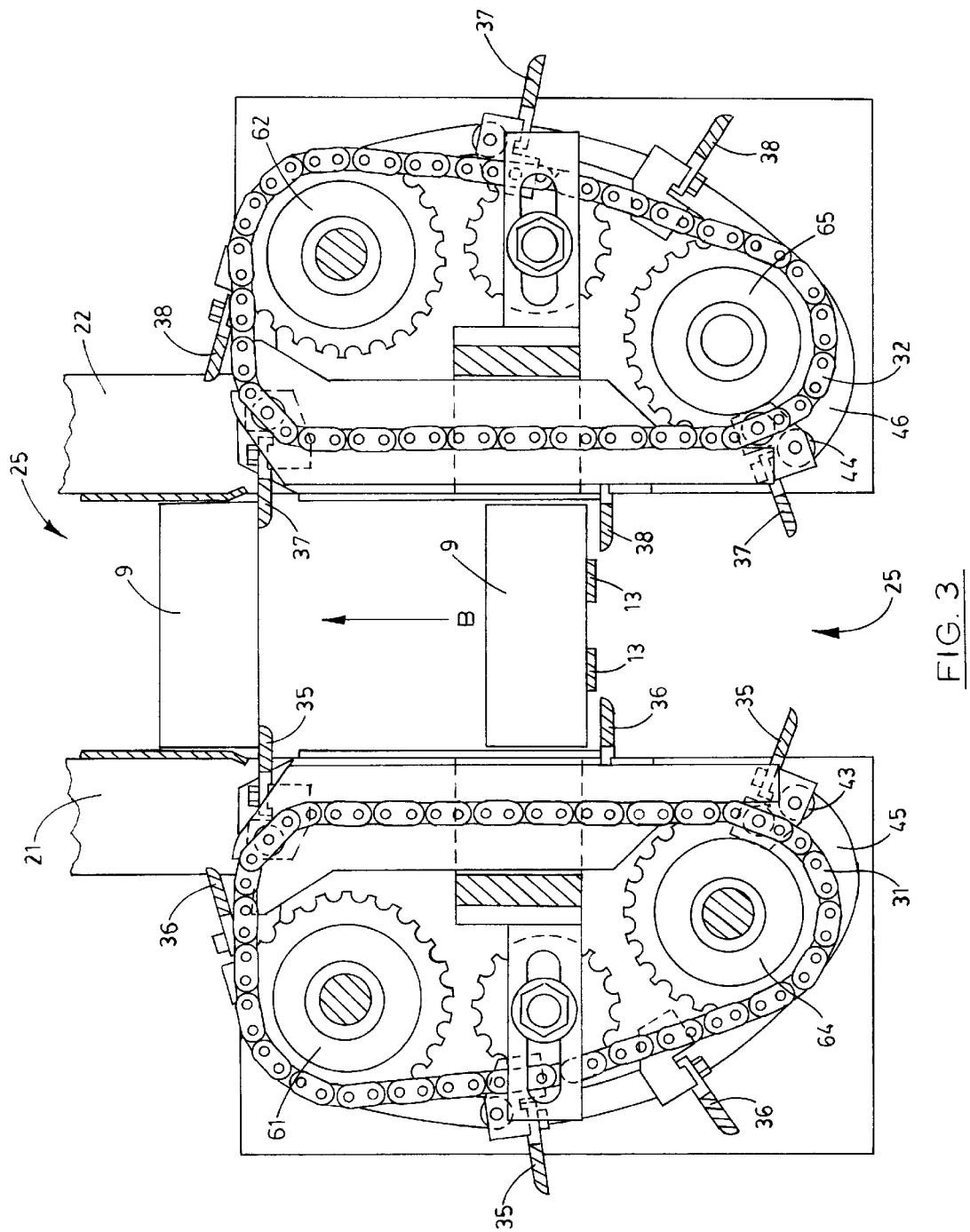
FIG. 3 is a cross-sectional cut-away end view of the invention along line 3—3 of FIG. 1.
Figure 4:
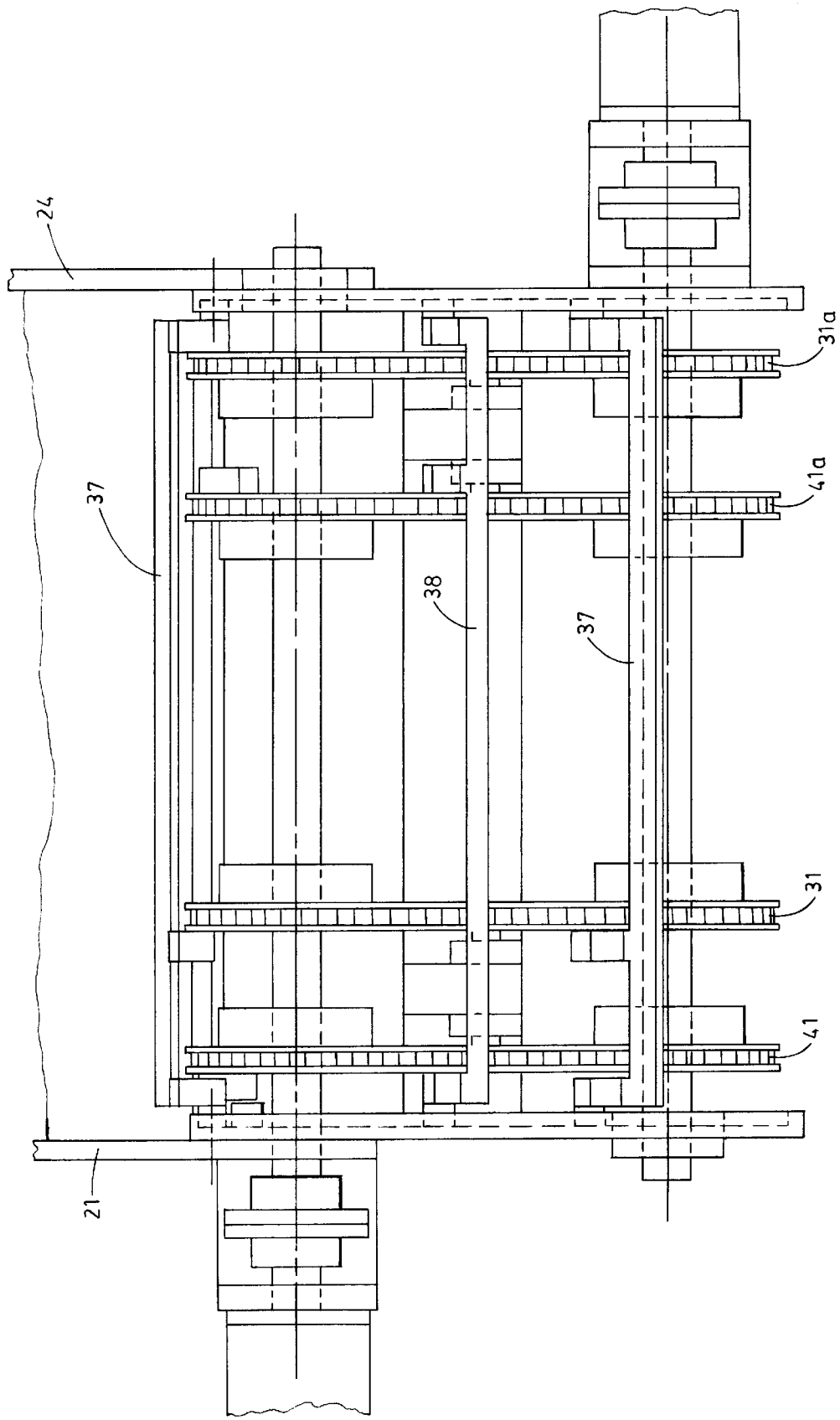
FIG. 4 is a side view along line 4—4 of FIG. 1.

Referring to the drawings wherein like reference characters designate like or corresponding parts throughout the several views, and referring particularly to FIGS. 1 and 3 it is seen that the invention includes a horizontal conveyance section 11 and a vertical lifting section 20. The horizontal section 11 includes lower conveyor belts 13, a first set of side conveyor belts 15, and a second set of side conveyor belts 17. Product packages 9 are placed on lower conveyors 13 which continuously urge the packages in the direction of arrow A towards the lifting section 20. Side conveyors 15 engage the sides of packages 9 also continuously urging the packages towards lifting section 20.

The second set of side conveyors 17 are designed to travel at a speed that is faster than the first set 15. The higher speed of conveyors 17 creates a time and space gap between each product package 9 that is received from conveyors 15. The speed of conveyors 17 may be selectively adjusted, with faster speeds providing larger gaps, and slower speeds providing smaller gaps. Once the speed of conveyor 17 is selected, it operates at this speed continuously, providing the same time and space gap between each package 9 that is delivered to the lifting section 20. The selected speed for conveyor 17 should be sufficient to provide a large enough gap between packages 9 to allow lifting panels 35 & 37 or 36 & 38 enough time to raise the delivered package(s) 9 before the next package(s) 9 are delivered.

The illustration of FIG. 1 shows an example delivery of two packages per row, although any number of packages can be delivered per row. In this example, after two packages have been delivered in a row by conveyors 17, the gap after delivery of the second package (which is the same as the gap between every package) gives the lift enough time to raise them up and out of the way, making room for delivery of the next row of two packages.

Referring to FIGS. 1 and 3, it is seen that the lift section 20 includes a generally rectangular area 25 bounded by adjustably positioned posts 21, 22, 23 and 24. Two pairs of continuous chains, bands or belts are provided on each side of area 25. Referring specifically to the end view of FIG. 3, a first pair of belts 31 and 31a are provided on the left side of area 25, and a corresponding pair of belts 32 and 32a are provided on the right side of area 25. Because the end view of FIG. 3 is cut away, it only shows belts 31 and 32 of each pair (compare to FIG. 1). The movement of belts 31 and 31a is identical; similarly, the movement of belts 32 and 32a is identical; accordingly, the following description of belts 31 and 32 is intended to also describe belts 31a and 32a. It is to be noted that the positioning and motion of the group made up of belts 31, 31a, and their associated parts and panels are mirror images of the group made up of belts 32, 32a, and their associated parts and panels.

Left side belt 31 is continuous, and is engaged around upper wheel 61 and lower wheel 64. Motion is imparted to upper wheel 61 by a controllable start/stop motor 71. Corresponding right side belt 32 is also continuous, and is engaged around upper wheel 62 and lower wheel 65. Motion is imparted to upper wheel 62 by a controllable start/stop motor 72. In an alternative embodiment, a set of linkages may be provided to allow a single motor 71 to impart motion to belts 31 and 31a as well belts 32 and 32a, thereby eliminating the need for motor 72. The illustrations of belts 31 and 32 in FIG. 3 show the use of chains engaged around upper and lower sprockets; however, any suitable continuous belt and wheel combination may be used. At least two lifting panels 35 are pivotally attached at regular intervals to belt 31, one end of panel 35 being pivotally attached to belt 31, the other end being pivotally attached to belt 31a. Similarly, at least two correspondingly positioned lifting panels 37 are pivotally attached at the same intervals on belt 32, one end of panel 37 being pivotally attached to belt 32, the other end being pivotally attached to belt 32a. One of the mounts supporting each panel 35 includes a follower 43 which fits into a groove 45 along the path of belt 31 (or 31a). Similarly, one of the mounts of each panel 37 includes a corresponding follower 44 which fits into a groove 46 along the path of belt 32 (or 32a).

The path of belt 31 (and groove 45) is in the form of a modified oval which is generally vertical on the inside of lift area 25, and more arcuate on the outside of area 25. The corresponding path of belt 32 (and groove 46) is also in the form of a modified oval which is a mirror image of the path of belt 31. From the view of FIG. 3, it is seen that belt 31 rotates in a counter-clockwise direction, and belt 32 rotates in a clockwise direction.

As each of belts 31 and 32 rotate, panels 35 and 37 are raised vertically as they travel through the inside of area 25. This movement causes panels 35 and 37 to lift containers 9 which have been delivered into area 25 upward in the direction of arrow B. The illustration of FIG. 3 shows panels 35 and 37 having reached the uppermost position in area 25 holding packages 9. As this upward movement is taking place, conveyor 17 continues its spaced delivery of packages, the space (gap) between deliveries providing sufficient time for panels 35 and 37 to move out of the way. With proper adjustment of the speed and timing of all conveyors and belts, by the time panels 35 and 37 have been raised to just above the height of a package 9 (high enough to allow the next package or row of packages to be brought in under them), a subsequent package is being moved through conveyors 17 for delivery to lift area 25. The moment panels 35 and 37 are high enough, conveyors 17 deliver the next package or row of packages 9 to lift area 25.

Panels 35 and 37 continue moving in an upward direction as the subsequent package or row of packages 9 is brought in below them. When panels 35 and 37 reach their uppermost position (as shown in FIG. 3) they stop momentarily. By this time, the new package or row of packages 9 is now in position below panels 35 and 37, and is ready to be raised.

A second group of pairs of continuous belts 41, 41a and 42, 42a having pivotally attached corresponding lifting panels 36 and 38, respectively, are provided to raise alternate packages or rows of packages 9. The positions of belts 41 and 41a are slightly offset from belts 31 and 31a (see FIG. 1), and the timing of operation of belts 41 and 41a is staggered in relation to that of belts 31 and 31a, but otherwise belts 41 and 41a operate in an identical fashion to belts 31 and 31a. Similarly, the positions of belts 42 and 42a are slightly offset from belts 32 and 32a (see FIG. 1), and the timing of operation of belts 42 and 42a is staggered in relation to that of belts 32 and 32a, but otherwise belts 42 and 42a operate in an identical fashion to belts 32 and 32a. It is to be noted that the positioning and motion of the group made up of belts 41, 41a, and their associated parts and panels 36 are mirror images of the group made up of belts 42, 42a. and their associated parts and panels 38.

Left side belts 41 and 41a are continuous, and are engaged around upper and lower wheels (not shown). Motion is imparted to these wheels by a controllable start/stop motor 73. Corresponding right side belts 42 and 42a are also continuous, and are engaged around upper and lower wheels (not shown). Motion is imparted to these wheels by another controllable start/stop motor 74. In an alternative embodiment, a set of linkages may be provided to allow a single motor 73 to impart motion to belts 41 and 41 a as well as belts 42 and 42a, thereby eliminating the need for motor 74.

Panels 36 and 38 are rotated into position below the new package or row of packages 9 while panels 35 and 37 are in the process raising the previous package or row of packages 9 upward. As noted previously, panels 35 and 37 stop momentarily when they reach the uppermost position shown in FIG. 3. During this pause, panels 36 and 38 begin to raise the new package or row of packages upward. As the upper edges of the new packages 9 being raised by panels 36 and 38 reach stopped panels 35 and 37, panels 35 and 37 are again activated and moved out of the way. This results in the packages previously being held by panels 35 and 37 coming to rest on top of the new packages being held by panels 36 and 38, creating a stack.

The tops of the interior vertical sections of the paths of belts 31 and 32 (and grooves 45 and 46) turn sharply to the outside of lift area 25, making a turn of approximately ninety degrees. Grooves 45 and 46 are formed to work in conjunction with followers 43 and 44 to keep the surfaces of panels 35 and 37 level (i.e. horizontal) while the panels are pulled to the outside by belts 31 and 32. Thus, panels 35 and 37 are pulled laterally out from under packages 9 after they have been raised (as shown in FIG. 3), enabling a smooth transition as the packages are stacked. Without the control of the grooves and followers, the removal of panels 35 and 37 (and 36 and 38) from under the raised packages could jostle and unsettle them, and potentially disrupt the upwardly formed stack.

An identical set of grooves and followers are provided for panels 36 and 38. Alternatively, panels 35 and 37 may share the same grooves as panels 36 and 38, each panel having its own followers.

Because multiple panels 35 and 37 are attached to belts 31 and 32, as some of said panels are moving laterally out from under packages, other panels on the same band are moving into position under the next incoming package or row of packages, etc. Similarly, the plurality of panels 36 and 38 on belts 41 and 42 allow some to be raising packages upward while others are moving down the outside of area 25.

The movements and actions of the first belts 31 and 32 and their corresponding panels are staggered from (although slightly overlapping) the movements and actions of the second belts 41 and 42 in order to provide a continuous stacking operation, generally alternating between the first and second belts. An electronic or other suitable may be used to activate the motors, belts and panels in this overlapingly alternating operation. The first belts and panels raise a first set of packages upward, the second belts and panels come in from underneath to raise a second set of packages upward; the first belts remove their panels from under the first packages (while the second set is raising its packages) and move other panels into position underneath to raise a third set of packages; the third set is raised and the second belts remove their panels from under the second packages while moving other panels in underneath a fourth set of packages, and so on.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

I claim:

1. An apparatus for continuously stacking packages for insertion into a container comprising a conveyor for delivering packages into a rectangular lift area, said lift area being bounded on each of two parallel sides adjacent to said conveyor by first and second pairs of belts on each side of the lift area, each of said first pairs being in mirror image relationship to each other, and each of said second pairs being in mirror image relationship to each other, each such belt being attached to a motion imparting means in order to travel on a revolving path which moves upstream on the inside of the lift area and downstream on the outside of the lift area; a plurality of flat panels attached to each pair of belts in a spaced relationship, each such panel extending outward in relation to the path of the belts in order to support and raise packages in the lift area, the positions of the panels attached to the first pairs of belts on opposite sides of the lift area corresponding to each other, and the positions of the panels attached to the second pairs of belts on opposite sides of the lift area independently corresponding to each other and being offset from the panels of said first pairs.

2. The apparatus of claim 1 wherein a groove is provided along the path of each pair of belts, and each panel is provided with a follower which fits into one of said grooves, the interaction of said grooves and followers keeping the surfaces of said panels level while said panels are pulled to the outside at the top of the lift area.

3. The apparatus of claim 2 wherein said motion imparting means comprises a first controllable motor for simultaneous operation of said first pairs of belts, and a second controllable motor for simultaneous operation of said second pairs of belts.

4. The apparatus of claim 2 wherein said motion imparting means comprises a first pair of controllable motors for simultaneous operation of said first pairs of belts, and a second pair of controllable motors for simultaneous operation of said second pairs of belts.

5. The apparatus of claim 2 wherein said conveyor for delivering packages comprises a pair of first horizontal side conveyors for continuously bringing packages to the stacking apparatus, and a second pair of adjustable speed side conveyors for quickly delivering packages from said first conveyors to the bottom of the lift area creating a time and space gap between the delivery of each package.

6. The apparatus of claim 5 wherein a bottom conveyor is provided linking said first and second side conveyors to the bottom of the lift area.

7. An apparatus for continuously stacking packages for insertion into a container comprising:
 a. a first horizontal conveyor for continuously bringing packages to the stacking apparatus;
 b. a second adjustable speed conveyor for quickly delivering packages from said first conveyor to a lift area creating a time and space gap between the delivery of each package;
 c. a first set of lifting panels, the panels of said set being disposed on opposite sides of said lift area and respectively attached to one of two first pairs of continuous revolving belts located on opposite sides of the lift area, the positions of said panels and belts corresponding to each other in a mirror image relationship;
 d. at least one first controllable motor for simultaneous operation of said first pairs of belts;
 e. a second set of lifting panels, the panels of said set being disposed on opposite sides of said lift area and respectively attached to one of two second pairs of continuous revolving belts located on opposite sides of the lift area, the positions of said second panels and belts corresponding to each other in a mirror image relationship and being offset from the positions of said first panels and belts; and
 f. at least one second controllable motor for simultaneous operation of said second pairs of belts
 wherein said first and second motors, belts and panels are activated in overlapingly alternating operation.

8. The apparatus of claim 7 wherein all of said belts travel on revolving continuous paths which move upstream on the inside of the lift area and downstream on the outside of the lift area.

9. The apparatus of claim 8 wherein a groove is provided along the path of each pair of belts, and each lifting panel is provided with a follower which fits into one of said grooves, the interaction of said grooves and followers keeping the surfaces of the lifting panels level while said panels are pulled to the outside at the top of the lift area.

10. The apparatus of claim 9 wherein first linkages are provided on said first controllable motor for simultaneous operation of said first pairs of belts, and second linkages are provided on said second controllable motor for simultaneous operation of said second pairs of belts.

11. The apparatus of claim 9 wherein a first pair of controllable motors are provided for simultaneous operation of said first pairs of belts, and a second pair of controllable motors are provided for simultaneous operation of said second pairs of belts.

12. A method for continuously stacking packages for insertion into containers comprising the steps of:
 a. continuously supplying said packages on a conveyor moving towards a stacking apparatus;
 b. quickly delivering said packages from said conveyor to a lift area such that an adjustable time and space gap is created between the delivery of each package;
 c. raising every other package delivered to said lift area using a first set of pairs of lifting panels, each such pair being disposed on opposite sides of said lift area and respectively attached to one of a first set of continuous belts located on opposite sides of said lift area;
 d. raising each remaining alternate package using a second set of pairs of lifting panels, each such pair being disposed on opposite sides of said lift area and respectively attached to one of a second set of continuous belts located on opposite sides of said lift area, said second set of pairs of lifting panels and said second set of continuous belts operating in overlapingly alternating operation from said first set of pairs of lifting panels and said first set of continuous belts; and
 e. creating a stack of packages from the bottom up.

13. The method of claim 12 wherein a plurality of packages are delivered to said lift area between each gap, and each such plurality of packages is raised in alternative sequence by said first and said second pairs of lifting panels.

* * * * *

UNITED STATES PATENT AND TRADEMARK OFFICE
CERTIFICATE OF CORRECTION

PATENT NO.     : 6,135,705
DATED          : October 24, 2000
INVENTOR(S)    : Brian Katoch It is certified that error appears in the above-identified patent and that said Letters Patent is hereby corrected as shown below:

<u>Title page,</u>
The title showing the illustrative figure should be deleted and replaced with the attached title page.

<u>Drawings,</u>
Figure 1, should be deleted and replaced with the corrected Figure 1, as shown on the attached page.

Signed and Sealed this

Twenty-sixth Day of March, 2002

Attest:

JAMES E. ROGAN
*Attesting Officer*       *Director of the United States Patent and Trademark Office*

United States Patent [19]
Katoch

[11] Patent Number: 6,135,705
[45] Date of Patent: Oct. 24, 2000

[54] PRODUCT STACKING METHOD AND APPARATUS

[75] Inventor: Brian Katoch, Reedley, Calif.

[73] Assignee: Salwasser Manufacturing Company, Inc., Reedley, Calif.

[21] Appl. No.: 09/276,924

[22] Filed: Mar. 26, 1999

[51] Int. Cl.$^7$ ................................................. B65G 57/30
[52] U.S. Cl. ................. 414/795; 414/795.3; 198/461.3
[58] Field of Search ............................. 414/795, 795.3; 198/461.3

[56] References Cited

U.S. PATENT DOCUMENTS

| | | | |
|---|---|---|---|
| 1,292,635 | 1/1919 | Parker | 414/795 |
| 2,570,198 | 10/1951 | Brager | 414/795 |
| 3,685,671 | 8/1972 | Layman | 214/6 BA |
| 3,895,477 | 7/1975 | Yamashita | 53/59 R |
| 4,030,528 | 6/1977 | Horning | 141/10 |
| 4,815,581 | 3/1989 | Deutschlander | 198/461 |
| 4,955,783 | 9/1990 | Grazia | 414/795 |
| 4,958,983 | 9/1990 | Fisch | 414/795.3 |
| 5,088,883 | 2/1992 | Focke et al. | 414/795 |
| 5,142,844 | 9/1992 | Frye | 53/475 |
| 5,261,782 | 11/1993 | Smith | 414/795.3 |
| 5,419,425 | 5/1995 | Goater | 198/461.3 |
| 5,626,335 | 5/1997 | Radwanski et al. | 271/159 |
| 5,641,072 | 6/1997 | Otake | 209/524 |
| 5,727,925 | 3/1998 | Ozawa et al. | 414/795.3 |
| 5,762,175 | 6/1998 | Focke et al. | 198/461.2 |
| 5,832,693 | 11/1998 | Yuyama et al. | 53/169 |
| 5,882,176 | 3/1999 | Marcoux | 414/795.3 |

*Primary Examiner*—Douglas Hess
*Assistant Examiner*—Joseph A. Fischetti
*Attorney, Agent, or Firm*—Mark D. Miller

[57] ABSTRACT

Disclosed is a new machine for continuously stacking packages in a vertical orientation for insertion into cases. A lift area is provided having a plurality of lateral lifting panels on either side. The panels are adjustably attached to pairs of continuous rotating bands, such that for each panel on one side there is a corresponding panel on the other side. The panels are provided in two independently operated sets, each set having identical operation, but with alternating action. Two horizontal conveyors deliver packages to the lifting area, the conveyor closer to the lift operating at a faster speed than the more distant conveyor. The faster speed creates a time and space gap between packages delivered to the lifting area, which gap may be increased or decreased by varying the conveyor speed. As the conveyors deliver packages to the lifting area, the two sets of lifting panels are alternatively activated to raise the packages in a stack, providing a continuous stacking operation.

13 Claims, 4 Drawing Sheets

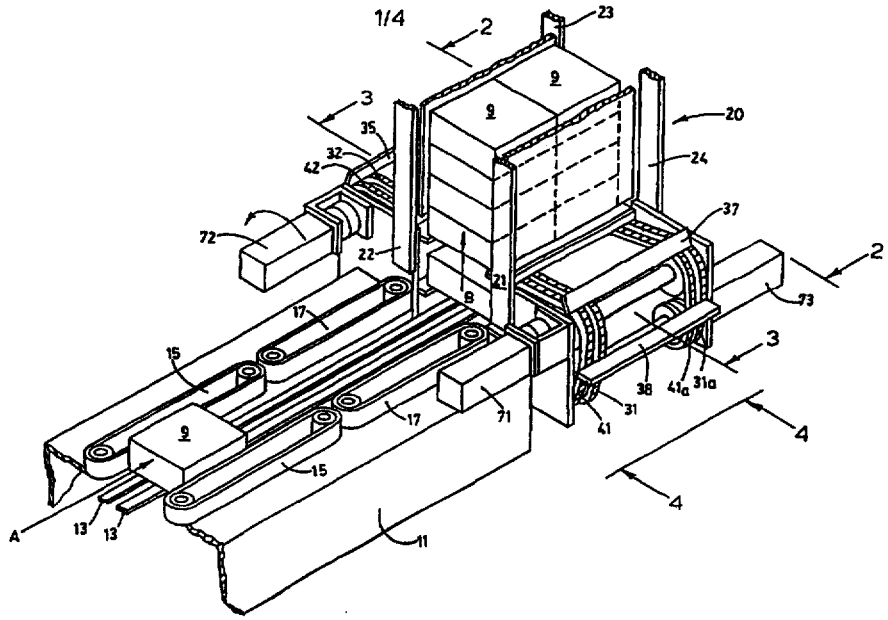

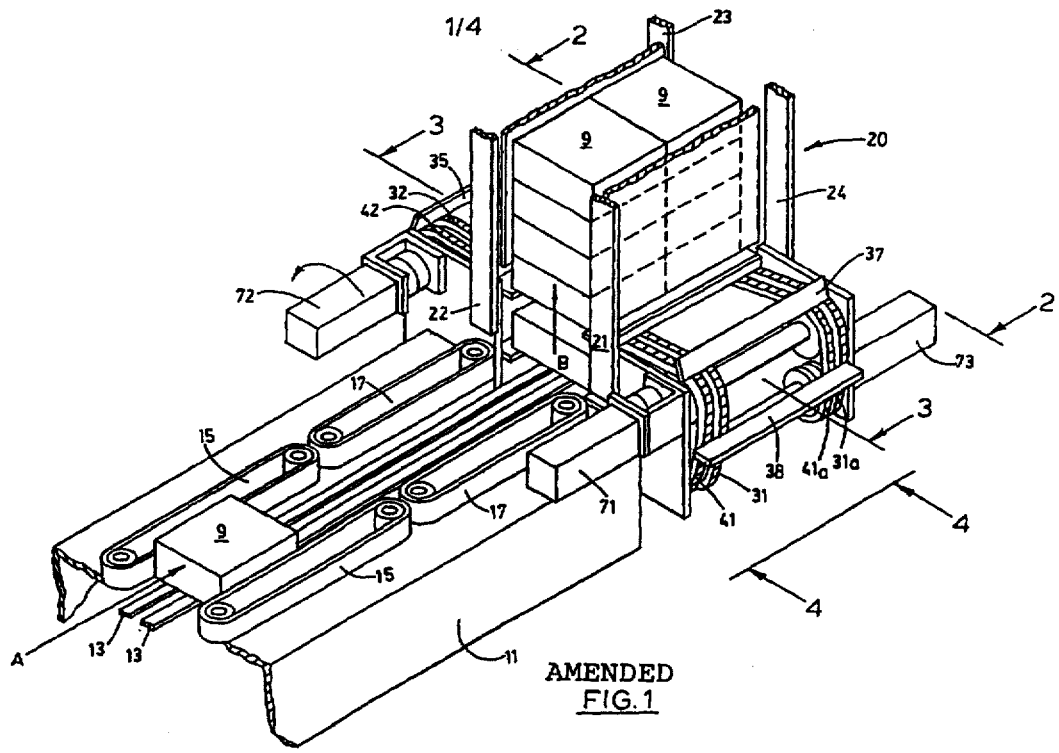
AMENDED
FIG. 1